United States Patent
Quijano (10) Patent No.: US 7,660,332 B2
(45) Date of Patent: Feb. 9, 2010

(54) SUPPORTING SYNCHRONIZATION STATUS MESSAGES ON BUILDING INTEGRATED TIMING SUPPLY SYNCHRONIZATION SUPPLY UNIT REMOTE SHELVES

(75) Inventor: Santiago Quijano, San Jose, CA (US)

(73) Assignee: Symmetricom, Inc., San Jose, CA (US)

( * ) Notice: Subject to any disclaimer, the term of this patent is extended or adjusted under 35 U.S.C. 154(b) by 828 days.

(21) Appl. No.: 10/349,576

(22) Filed: Jan. 23, 2003

(65) Prior Publication Data

US 2003/0152109 A1    Aug. 14, 2003

Related U.S. Application Data

(60) Provisional application No. 60/354,835, filed on Feb. 5, 2002.

(51) Int. Cl.
*H04J 3/06* (2006.01)

(52) U.S. Cl. .................. 370/516; 398/155; 375/356

(58) Field of Classification Search .............. 370/503, 370/516, 507, 509, 270, 350, 463, 465, 510–514, 370/518, 522, 524, 539; 375/316, 340, 285, 375/93, 328, 354, 356, 362; 326/93; 398/66, 398/70, 154–155; 455/502
See application file for complete search history.

(56) References Cited

U.S. PATENT DOCUMENTS

| 6,041,666 | A  | * | 3/2000 | MacKarvich | 73/862.391 |
|---|---|---|---|---|---|
| 6,163,551 | A  | * | 12/2000 | Wolf | 370/503 |
| 6,185,247 | B1 | * | 2/2001 | Williams et al. | 375/212 |
| 6,895,189 | B1 | * | 5/2005 | Bedrosian | 398/155 |
| 6,937,613 | B1 | * | 8/2005 | Bedrosian | 370/465 |
| 7,085,237 | B1 | * | 8/2006 | Teodorescu | 370/242 |
| 2002/0097743 | A1 | * | 7/2002 | Baydar et al. | 370/463 |
| 2004/0062279 | A1 | * | 4/2004 | Primrose et al. | 370/503 |

* cited by examiner

*Primary Examiner*—Aung S Moe
*Assistant Examiner*—Habte Mered
(74) *Attorney, Agent, or Firm*—Patterson & Sheridan, LLP (57) ABSTRACT

Systems and methods are described for supporting synchronization status messages (SSM) on building integrated timing system synchronization supply unit (BITS-SSU) remote shelves. A method includes providing a composite clock reference to a remote synchronization supply unit from a master synchronization supply unit; providing a synchronization status message to the remote synchronization supply unit; relaying the composite clock reference from the remote synchronization supply unit; and relaying the synchronization status message from the remote synchronization supply unit. An apparatus includes: a master synchronization supply unit; and a remote synchronization supply unit coupled to the master synchronization supply unit, the remote synchronization supply unit including a composite clock reference input to receive a composite clock reference from the master synchronization supply unit, a composite clock output to relay the composite clock reference, a synchronization status message input to receive a synchronization status message, and a synchronization status message output to relay the synchronization status message.

5 Claims, 4 Drawing Sheets

SUPPORTING SYNCHRONIZATION STATUS MESSAGES ON BUILDING INTEGRATED TIMING SUPPLY SYNCHRONIZATION SUPPLY UNIT REMOTE SHELVES

CROSS-REFERENCE TO RELATED APPLICATION

This application is related to and claims a benefit of priority under 35 U.S.C. 119(e) from copending U.S. Ser. No. 60/354,835, filed Feb. 5, 2002, the entire contents of which are hereby expressly incorporated herein by reference for all purposes.

BACKGROUND OF THE INVENTION

1. Field of the Invention

The invention relates generally to the field of data networks. More particularly, the invention relates to methods of relaying synchronization status messages (SSM) at remote synchronization supply units (SSU), and remote synchronization supply units (SSU) that can relay synchronization status messages (SSM).

2. Discussion of the Related Art

Synchronization is essential for telecommunications networks. In order to generate stable and precise synchronization signals timing signal generators (TSGs) or synchronization supply units (SSUs) are installed in central offices. This is strongly recommended by many US and international telecommunication standards. The concept of having timing signal generators or synchronization supply units that generate and distribute signals within a central office is called BITS (building integrated timing supply) or SASE (stand alone synchronization equipment).

Due to the large amount of network elements (NEs) distributed inside central offices, and the redundant synchronization paths that are required to transport signals within the building, the SSUs have to provide a considerable amount of output signals through the entire building. The most-commonly used synchronization signals in the US are the DS1 (1.544 Mb/s) and the composite clock (CC) signals.

Figure 1:
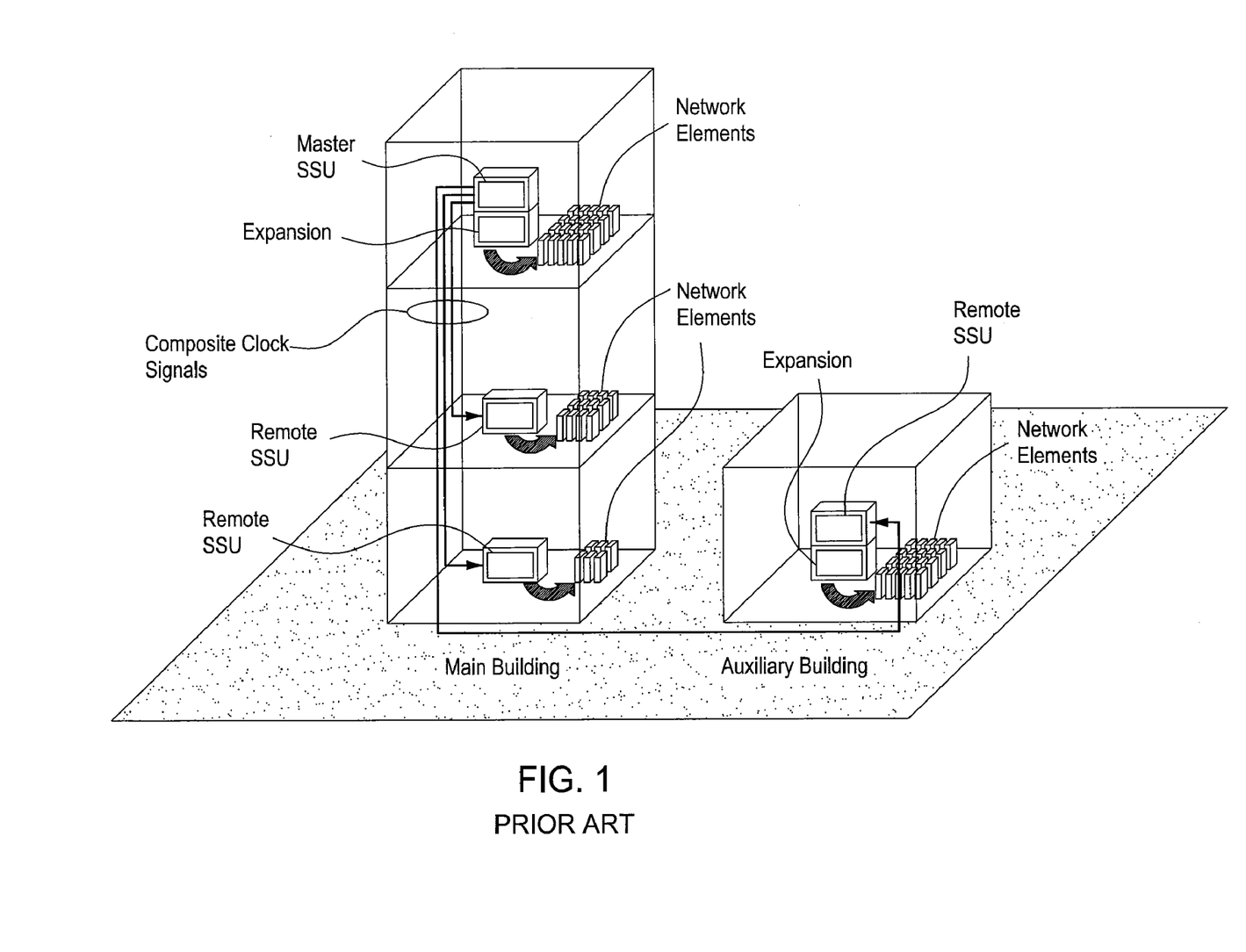
FIG. 1 illustrates a schematic perspective view of a conventional star topology with three remote synchronization supply units connected to a master synchronization supply unit, appropriately labeled "PRIOR ART."

Remote SSU shelves strategically located within the same building or in adjacent buildings help distribute synchronization signals through the central office in remote locations. These shelves are typically slaved to the unique master synchronization supply unit shelf via composite clock signals, although other reference signal types could be used. However, due to phase alignment requirements of the composite clock driven network elements, remote synchronization supply units must be synchronized using composite clock signals in order to keep phase integrity with the master synchronization supply unit and all through the whole central office. FIG. 1 shows a typical application of the synchronization supply unit master and remote concept within a central office.

On the other hand, network elements that are synchronized via DS1 signals that originate at a remote synchronization supply unit may require synchronization status messages (SSM). The remote synchronization supply unit should be able to provide synchronization status messages to these network elements. The synchronization status messages are determined by the master shelf and should be relayed by the remote synchronization supply units to all the network elements in the building. However, since the remote synchronization supply units are connected to the master shelves via composite clock lines, the synchronization status messages cannot be transmitted via composite clock signals. This creates a problem when remote synchronization supply units have to be phased aligned and need to distribute synchronization status message signals to the DS1 driven network elements.

Figure 2:
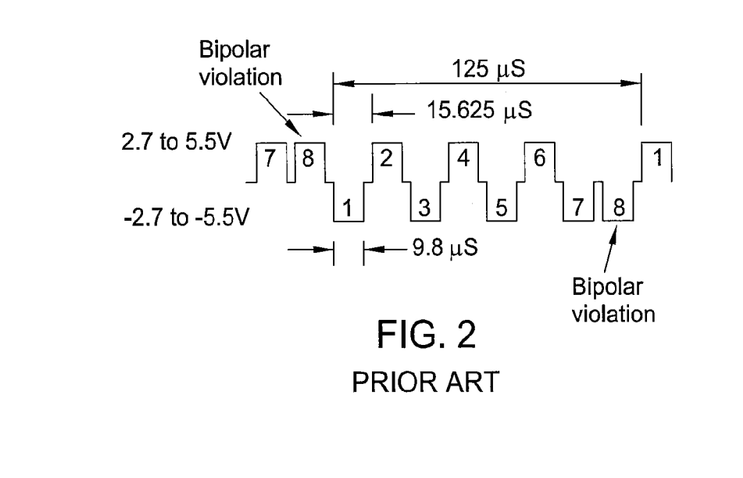
FIG. 2 illustrates a time domain view of a conventional composite clock signal, appropriately labeled "PRIOR ART."

A critical requirement for most network elements that use composite clock signals is phase alignment. Phase alignment is achieved when all the data bits (1 through 8) on all the composite clock signals within the central office have the same polarity at the same time. For a remote synchronization supply unit it means that all its composite clock outputs must be phase aligned with its composite clock reference inputs. The composite clock signal specification is defined by Telcordia (Bellcore) GR-378-CORE and TR-TSY-000458 for signal type, amplitude, and wave shape, and is shown in FIG. 2.

Synchronization supply unit composite clock signals do not carry any useful information. All data bits of a composite clock signal are set to "1" to facilitate clock recovery on the other end. This feature makes the composite clock signal useless to carry any additional information, such as a synchronization status message to other synchronization supply units.

Synchronization status messages are messages that indicate the quality of the synchronization signal within a network. These messages can pass from one network element to another and, if properly used, can avoid timing loops when reconfigurations happen within a network. They also can be a useful tool for monitoring and maintaining the health of the synchronization signals that travel within a network.

In DS1 signals synchronization status messages travel in the data link (DL) bit of the ESF framing and consists of a 16-bit codeword. These messages are defined by different entities like ANSI TR#33 and Telcordia (Bellcore) GR-378 in North America.

Figure 3:
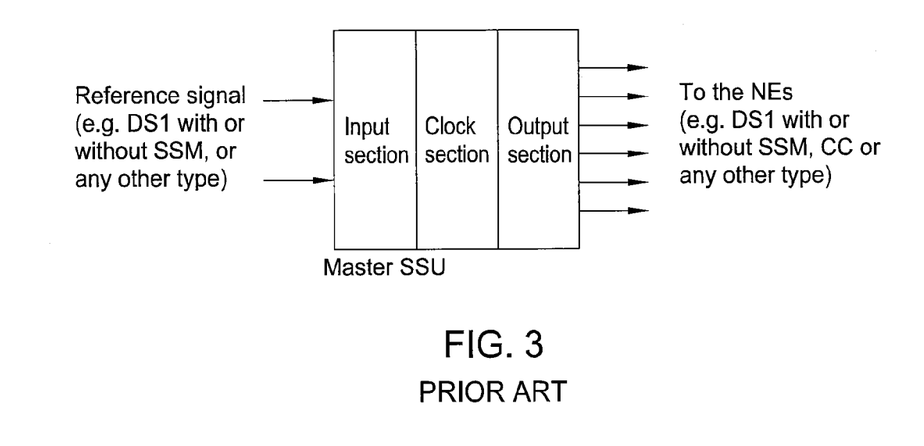
FIG. 3 illustrates a block schematic view of a conventional master synchronization supply unit, appropriately labeled "PRIOR ART."

FIG. 3 shows a typical master synchronization supply unit system. It accepts one or more input reference signals, which can be DS1, CC, or any other type. The DS1 signals can carry synchronization status messages as well. The master synchronization supply unit has internal high stability clocks, which help filtering out jitter and wander. These clocks provide holdover capability in the event that the reference signals are lost. This capability allows the network element connected to the clock to run for a certain period of time without losing synchronization. An output section generates different types of signals required by the network elements. The signals can be DS1, CC, or any other type including analog type of signals. The DS1 signals can contain synchronization status messages, which are broadcast to all the network elements connected to the master synchronization supply unit.

A remote synchronization supply unit is similar to a master synchronization supply unit (FIG. 3), except that the input signals are typically composite clock only, and may or may not have clocks. This remote synchronization supply unit is connected to any output signal of the master synchronization supply unit. Many remote synchronization supply units can be connected in a star topology to the master SSU. (FIG. 1)

Since the composite clock output signals should be phase aligned with the input reference signal, the clocks should not have any time constants that add some phase delay. These clocks provide a minimal holdover capability. If phase alignment is not a requirement, the remote shelf can accept DS1 or any other type of signal instead.

If composite clock phase alignment is required, the synchronization status message generated by the master synchronization supply unit, or any master synchronization source, cannot be relayed by the remote synchronization supply unit, since the composite clock signal does not provide any means of carrying synchronization status message data.

Current remote shelves do not support synchronization relaying capability, since there are no means of transmitting SSM information over the CC lines to the remote shelf. Typical connections to remote shelves are done using CC signals only, which as previously explained, do not carry this information, thus making the broadcast of SSM messages impossible.

A less common and seldom used method relies on management systems that reads the current SSM status from the master shelf and then send a command to the remote shelf, setting the appropriate SSM message. However, this method depends on an external management system and a specialized software, as well as connections links to the master and remote shelves, making it more expensive, more system manufacturer dependent and less reliable.

Heretofore, the need for relaying a synchronization status message to a network element by a remote synchronization supply unit has not been fully met. What is needed is a solution that addresses this need.

SUMMARY OF THE INVENTION

There is a need for the following aspects of the invention. Of course, the invention is not limited to these aspects.

According to an aspect of the invention, a process comprises: providing a composite clock reference to a remote synchronization supply unit from a master synchronization supply unit; providing a synchronization status message to the remote synchronization supply unit; relaying the composite clock reference from the remote synchronization supply unit; and relaying the synchronization status message from the remote synchronization supply unit.

According to another aspect of the invention, a machine comprises: a master synchronization supply unit; and a remote synchronization supply unit coupled to the master synchronization supply unit, the remote synchronization supply unit including a composite clock reference input to receive a composite clock reference from the master synchronization supply unit, a composite clock output to relay the composite clock reference, a synchronization status message input to receive a synchronization status message, and a synchronization status message output to relay the synchronization status message.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In general, the context of the invention can include synchronization of a data network. The context of the invention can include relaying synchronization status messages to network elements using remote synchronization supply unit(s) that is(are) also used to convey composite clock signals to the network elements. The context of the invention can also include logical processing (selection and routing) of multiple (e.g., redundant) composite clock signals and multiple (e.g., redundant) synchronization status messages.

The invention can include relaying synchronization status messages (SSM) at remote synchronization supply units (SSU), and remote synchronization supply units (SSU) that can relay synchronization status messages (SSM). The invention can include a methods and/or apparatus for supporting synchronization status messages (SSM) on building integrated timing supply synchronization supply unit (BITS-SSU) remote shelves. The invention can include a method to allow remote synchronization supply units (SSUs) to distribute synchronization status messages (SSM) signals and keep phase alignment on composite clock (CC) signals, without relying on external systems, such as management systems or any external device that retransmits information to the remote synchronization supply units.

In order to allow remote synchronization supply units to be phase aligned and to handle (convey) and relay (e.g., route and/or broadcast) synchronization status messages on their DS1 output signals, the invention can use composite clock signals as a timing reference, to keep phase alignment, and processing of DS1 signals to extract the synchronization status message information and relay that information to the DS1 outputs of the remote synchronization supply unit.

Figure 4:
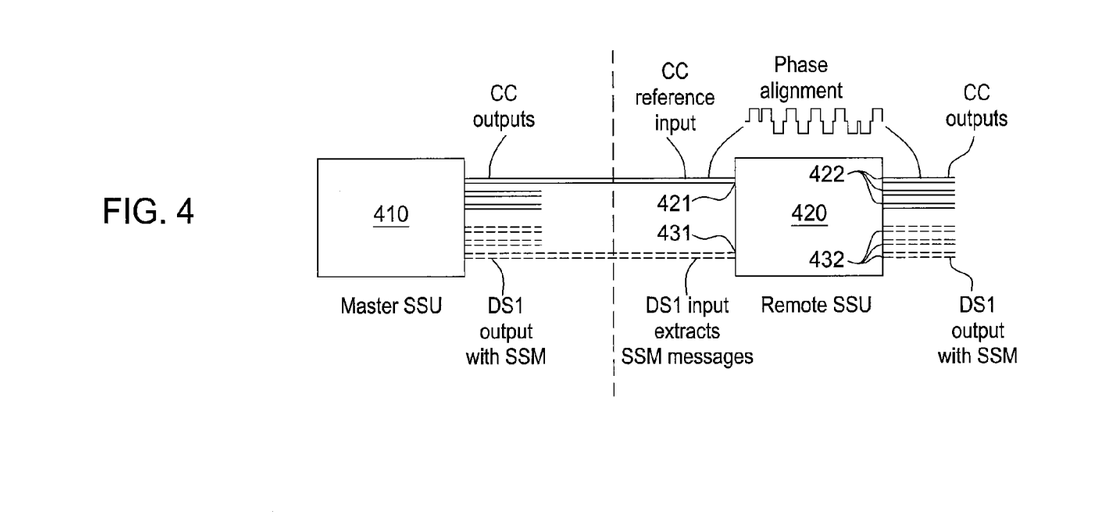
FIG. 4 illustrates a block schematic view of a synchronization status message relaying remote synchronization supply unit coupled to a master synchronization supply unit, representing an embodiment of the invention.

FIG. 4 shows a master synchronization supply unit 410 providing timing to a remote synchronization supply unit 420 via composite clock signals. The composite clock signals at the outputs 422 of the remote SSU are phase aligned with the composite clock signals at the input 421, thus keeping phase alignment within the central office.

Still referring to FIG. 4, the DS1 input(s) 431 are used to read the synchronization status message information sent by the master synchronization supply unit 410. The remote synchronization supply unit 420 relays the adequate synchronization status message to its DS1 outputs 432.

Figure 5:
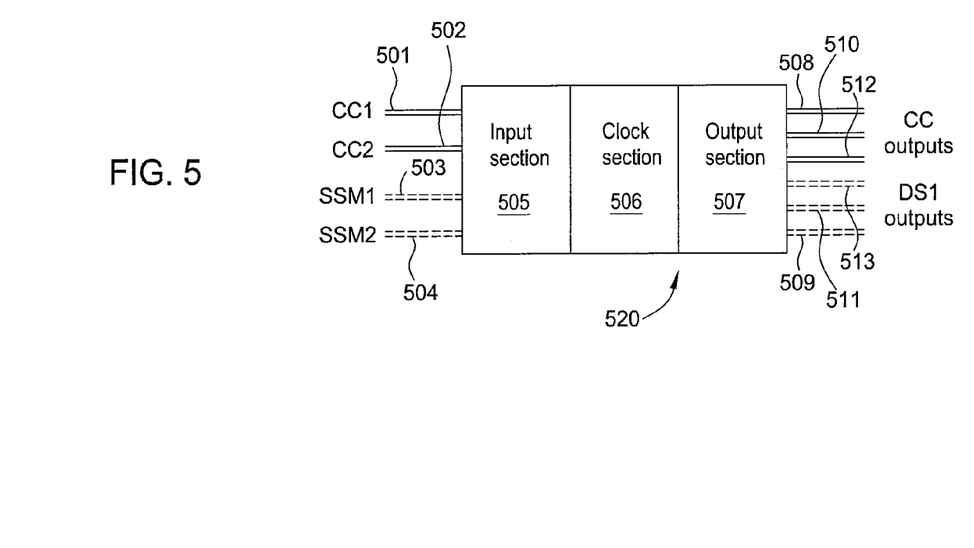
FIG. 5 illustrates a block schematic view of a synchronization status message conveying remote synchronization supply unit, representing an embodiment of the invention.

A more detailed view of another embodiment of a remote synchronization supply unit 520 is shown in FIG. 5. The remote synchronization supply unit 520 includes an input section 505. The input section includes a plurality of inputs 501-504. A clock section 506 is coupled to the input section 505. An output section 507 is coupled to the clock section 506. The output section includes a plurality of outputs 508-513.

Inputs 501 (CC1) and 502 (CC2) will accept composite clock signals only. These signals will be used as reference to synchronize the remote synchronization supply unit 420. The signals on inputs 503 (SSM1) and 504 (SSM2) can be used to extract the synchronization status message information coming from the source providing the timing reference. In this example the source providing the timing reference is the master synchronization supply unit (not shown in FIG. 5). For redundancy purposes, multiple inputs per type of signal can be advantageous. Two inputs per type of signal (CC and DS1) are recommended.

Still referring to FIG. 5, an input section 505 can support multiple inputs, if desired. For simplicity in the explanation of the following method, only 2 inputs for each CC and DS1 signals will be used.

Still referring to FIG. 5, inputs 501 and 503 have higher priority, and inputs 502 and 504 have lower priority. The inputs with higher priority are always selected first. If the signal has any problem, for example, has an incorrect format or framing error, is out of electrical specification(s) or is not present (i.e., LOS (Loss of Signal)), then the second priority input will be selected, if available and free of errors. Although the following explanation is limited to two (2) inputs per type of signal only, the invention it is not limited to any amount of inputs. No matter how many inputs, the principle of the invention can be the same.

Still referring to FIG. 5, the clock section 506 can have none, one or multiple clocks. The operation with two clocks will be described, although it can be extrapolated to a larger number of multiple clocks, if required. Again, there are no limitation on the amount of clocks that can be used by the invention.

Still referring to FIG. 5, the output section 507 can generate multiple outputs from each of the different types of inputs. In this example, only outputs with composite clock signals 508, 510 and 512 (CC outputs) and with DS1 signals 509, 511 and 513 (DS1 outputs) will be used.

The true-table shown in table 1 describes an exemplary behavior of the remote SSU and its output signals under different input conditions. The clock section 506 determines in cases 5 through 8 of the true-table the synchronization status message output. If no clocks are present (available in clock section 506), the SSM message can be any valid SSM message. In this case, it is preferred that either a "Don't Use for Sync" (DUS) or a "Sync Traceable Unknown" (STU) message is generated, although any valid preset value can be generated.

If one or more clocks are present (available in clock section 506), the generated synchronization status message should correspond to the level type of the active clock, or the immediate lower level if there is no direct equivalent. For example, if the active clock is a Stratum 3 type clock, then a corresponding "ST3" SSM message should be generated. If a clock better than Stratum 2 is active (e.g. Stratum 2 E), a "ST2" message should be generated, if there is no ST2E SSM message defined.

TABLE 1

| Case | Input CC1 (#1) | Input CC2 (#2) | Input SSM1 (#3) | Input SSM2 (#4) | Outputs CC (#8) and DS1 (#9) |
|---|---|---|---|---|---|
| 1 | G | X | S | X | 508: phase aligned with 501<br>509: SSM message is S (503) |
| 2 | — | G | S | X | 508: phase aligned with 502<br>509: SSM message is S (#3) |
| 3 | G | X | — | S | 508: phase aligned with #1<br>509: SSM message is S (504) |
| 4 | — | G | — | S | 508: phase aligned with 502<br>509: SSM message is S (504) |
| 5 | G | X | — | — | 508: phase aligned with 501<br>509: SSM message is generated by clock section 506 |
| 6 | — | G | — | — | 508: phase aligned with 502<br>509: SSM message is generated by clock section 506 |
| 7 | — | — | X | X | 508 and 509: in holdover. Outputs are not necessarily phase aligned with the original reference signal, since there is no input reference. The clock section 506 controls the stability of the signals.<br>509: SSM message is generated by clock section 506 |
| 8 | — | — | — | — | 508 and 509: in holdover. Outputs are not necessarily phase aligned with the original reference signal, since there is no input reference. The clock section 506 controls the stability of the signals.<br>509: SSM message is generated by clock section 506 |

G: good signal - qualified
—: no signal or bad signal - disqualified
S: signal with SSM message
X: don't care A sub-generic algorithm can be described as follows:

1. Determine whether composite clock signals and DS1 with synchronization status message signals are required.
2. While there is(are) valid composite clock input(s), select the highest priority input. Consequently, the composite clock outputs will be phase aligned with the selected input.
3. While there is(are) valid DS1 input(s) with synchronization status messages, select the highest priority input. Consequently, the DS1 outputs will follow the synchronization status message input messages.
4. If there is no DS1 input or no valid synchronization status message is present, then the DS1 outputs will generate a valid synchronization status message equivalent to the quality level of the active clock. If the active clock has a higher stability than any defined synchronization status message quality message, the next lower synchronization status message will be generated. If no clocks are present or active, then generate a predefined synchronization status message, such as DUS or STU.

5. If no composite clock inputs are present or valid, regardless of the status of the DS1 inputs, the remote synchronization supply unit should enter into holdover and generate an synchronization status message equivalent to the quality level of the active clock. If the active clock has a higher stability than any defined synchronization status message quality message, the next lower synchronization status message will be generated. If no clocks are present or active, then generate a predefined synchronization status message, such as DUS or STU.

Figure 6:
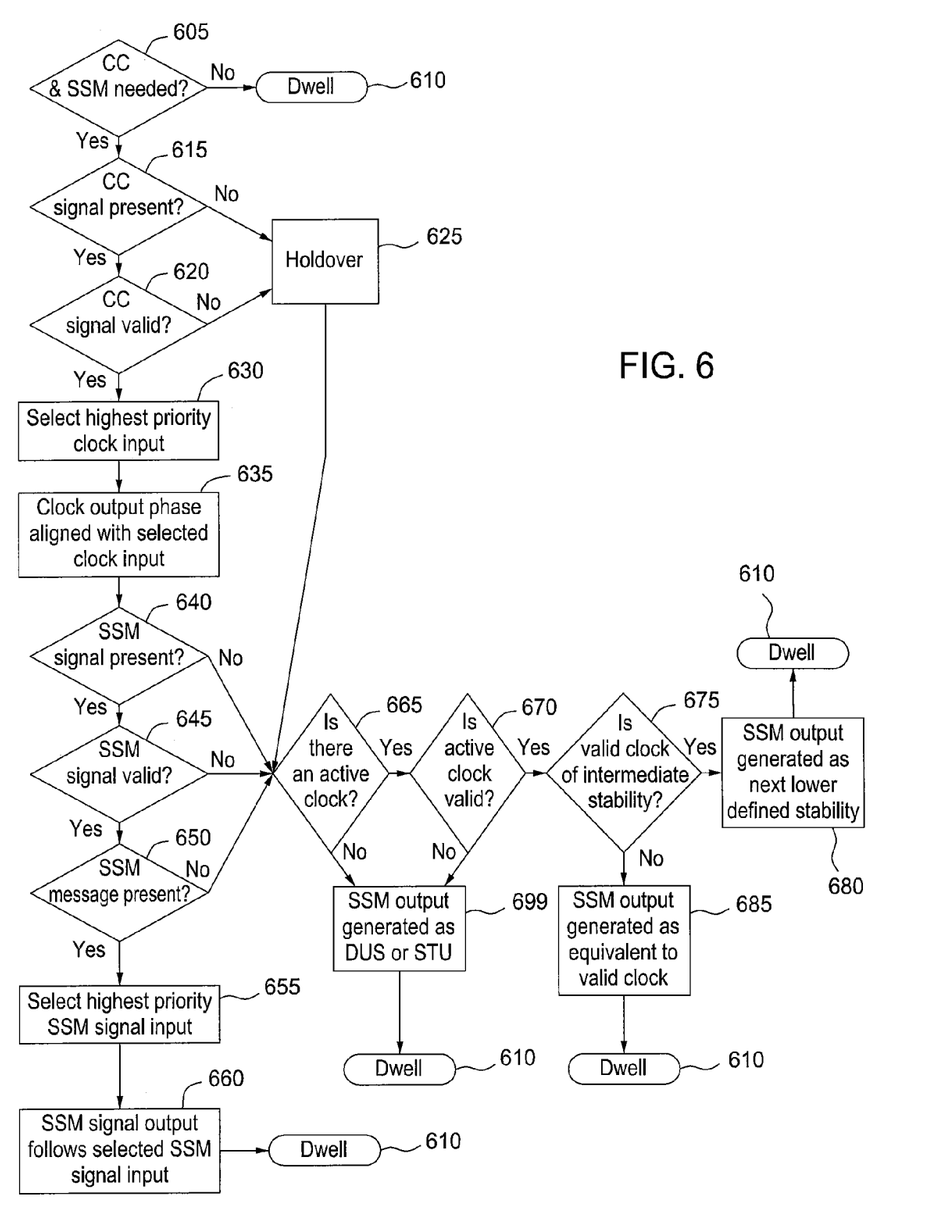
FIG. 6 illustrates a flow diagram of a process that can be implemented by a computer program, representing an embodiment of the invention.

A slightly more generic algorithm is depicted in FIG. 6. In block 605 it is determined if composite clock signals and synchronization status message signal are required. If not, the algorithm dwells in block 610 for a period of time and can then either terminate or begin at block 605 again.

Still referring to FIG. 6, if composite clock signals and synchronization status message signals are required, it is determined in block 615 whether a composite clock signal is present on one or more of the composite clock inputs. If a composite clock signal is present, then it is determined in block 620 whether the composite clock signal(s) is(are) valid. If one or more of the composite clock signals are valid, then the highest priority composite clock input is selected in block 630 and, consequently, the composite clock output is phase aligned with the selected clock input in block 635. If the result of the determination in either block 615 or 620 is negative, then the remote synchronization supply unit enters into holdover in block 625. The algorithm then proceeds to block 665 which will be described below.

Still referring to FIG. 6, from block 635, the algorithm then proceeds to block 640 where a determination is made of whether an synchronization status message signal is present on one of the SSM inputs. If a SSM signal is present, then a determination is made in block 645 of whether the SSM signal(s) is(are) valid. If one or more of the SSM signal is valid, then a determination is made in block 650 of whether the SSM signal(s) include an synchronization status message. If one or more of the valid SSM signals include an SSM, then the highest priority SSM signal input is selected in block 655 and, consequently, the SSM signal output follows the selected SSM signal input in block 660. If the result of the determination in block 640, 645 or 650 is negative, then algorithm proceeds to block 665.

Still referring to FIG. 6, at block 665, a determination is made of whether there is an active clock present. If an active clock is present, then a determination is made in block 670 of whether the active clock(s) is (are) valid. If no active a clock is present, or if no active clocks are valid, then the algorithm generates a predefined synchronization status message, such as DUS or STU in block 699.

Still referring to FIG. 6, if an active clock is valid, then a determination is made in block 675 of whether the valid active clock is of a stability that is higher than the stability represented by a predefined synchronization status message quality message and less than the stability of any other predefined synchronization status message quality (i.e., intermediate stability). If the valid active clock is of a stability that is higher than the stability represented by a predefined synchronization status message quality message and less than the stability of any other predefined synchronization status message quality (i.e., intermediate stability), then the SSM signal output is generated as equivalent to the next (closest) lower predefined stability in block 680. Conversely, if the valid active clock is of a stability that is equal to a stability represented by a predefined synchronization status message quality message, then the SSM signal output is generated as equivalent to the valid active clock in block 685.

Optionally, the invention can include a method to provide synchronization status messages capability on remote shelves based on adding DS1 lines that carry synchronization status message signals. Using these DS1 signals it is possible to transport synchronization status messages from the master shelf to any remote shelf, while keeping phase alignment via composite clock signals. Since it does not rely on any external system like a management system or specialized software, the invention can be used in conjunction with any timing signal generator or synchronization supply unit system from any manufacturer.

The invention can also include the use of DS1 lines to also carry clock information to be used as a synchronization reference, in the case that the composite clock input(s) fail. However, it is preferred not to do it that way, since phase alignment between DS1 and composite clock signals cannot be guaranteed.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The disclosed embodiments show electrical conductors as the structure for performing the function of conveying signals, but the structure for conveying signals can be any other structure capable of performing the function of conveying signals, including, by way of example an optical fiber, a radio link or even an acoustic link.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Practical Applications of the Invention

A practical application of the invention that has value within the technological arts is using DS1 lines as auxiliary lines to carry synchronization status message information to remote synchronization supply units combined with the described algorithm to keep phase alignment while transporting (relaying) and generating synchronization status messages, allows remote synchronization supply units to operate in central offices where remote phase alignment and synchronization status messages are required. There are virtually innumerable uses for the invention, all of which need not be detailed here.

Advantages of the Invention

A network synchronization system, representing an embodiment of the invention, can be cost effective and advantageous for at least the following reasons. The invention offers a clear advantage over other methods of propagating synchronization status messages to remote shelves. The synchronization status message sent by a master shelf is used by remote shelves to extract the synchronization status message and set the correct message on the remote outputs. In addition, the invention can be used in any network containing multiple vendor TSGs/SSUs, since it does not depend on proprietary methods to propagate the SSM signal to the remote shelves, like management systems and specialized software. The invention can be embodied to depend solely on the structure and features of the remote synchronization supply unit and its components (input, clock(s) and output sections). The remote synchronization supply unit does not require that the synchronization status message be sent from a master SSU. The remote synchronization supply unit system working with the described algorithm can coexist with existing synchronization supply units or work as a remote stand-alone synchronization supply unit. The invention improves quality and/or reduces costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the master synchronization supply unit(s), the remote synchronization supply unit(s) and/or the network element(s) described herein can be separate module(s), it will be manifest that the master synchronization supply unit(s), the remote synchronization supply unit(s) and/or the network element(s) may be integrated into the (sub) system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. In a central office having a master synchronization supply unit and remote network elements that are remotely located within the central office with respect to the master synchronization supply unit, a method for generating and relaying composite clock (CC) signals and DS1 signals with synchronization status messages using remote synchronization supply units that are remotely located within the central office with respect to the master synchronization supply unit, comprising:

receiving first and second composite clock references and first and second synchronization status messages at a remote synchronization supply unit from a master synchronization supply unit, the remote synchronization supply unit having two or more composite clock (CC) input and output lines and DS1 input and output lines;

determining the validity of the first and second CC references and selecting the highest priority valid CC reference;

generating a composite clock signal that is phase aligned with the highest priority valid CC reference at the remote synchronization supply unit that received the first and second CC references and the first and second synchronization status messages, and relaying the generated composite clock signal to at least one of the remote network elements via one of the CC output lines; and relaying the synchronization status message from the remote synchronization supply unit that received the first and second CC references and the first and second synchronization status messages to said at least one of the remote network elements via one of the DS1 output lines, while maintaining phase alignment based on the highest priority valid CC reference.

2. A method as claimed in claim 1, further comprising the step of: if there is no DS1 input or valid synchronization status message, the DS1 outputs will carry a synchronization status message equivalent to the quality level of an active clock of the remote synchronization supply unit.

3. A method as claimed in claim 2, wherein the quality level of the synchronization status message is less than the quality level of the active clock.

4. A method as claimed in claim 2, wherein if no DS1 input or no valid synchronization status message is received, and no local clock is present in the remote synchronization supply unit, the synchronization status message output can be any valid synchronization status message including either a DUS (don't use for sync) message or STU (sync traceable unknown) message.

5. In a central office having a master synchronization supply unit and remote network elements that are remotely located within the central office with respect to the master synchronization supply unit, a remote synchronization supply unit that is remotely located within the central office with respect to the master synchronization supply unit and connected between the master synchronization supply unit and at least one of the remote network elements, comprising:

first and second composite clock inputs to receive first and second composite clock (CC) references from the master synchronization supply unit;

a composite clock output to relay a composite clock signal that is phase aligned with one of the first and second CC references to at least one of the remote network elements, the composite clock signal being phase aligned with the CC reference having the highest priority;

first and second DS1 inputs to receive first and second synchronization status messages from the master synchronization supply unit;

a DS1 output to relay one of the first and second synchronization status messages to said at least one of the remote network elements, the DS1 output relaying the synchronization status message having the highest priority;

wherein the remote synchronization supply unit is programmed to generate the composite clock signal that is phase aligned with one of the first and second CC references and to relay one of the first and second synchronization status messages received at the DS1 input to the DS1 output, while maintaining phase alignment based on the highest priority valid CC reference.

* * * * *